United States Patent [19]

Luniewski

[11] Patent Number: 4,484,341
[45] Date of Patent: Nov. 20, 1984

[54] METHOD AND APPARATUS FOR SELECTIVELY RADIATING MATERIALS WITH ELECTRONS AND X-RAYS

[75] Inventor: Robert Luniewski, Smithtown, N.Y.

[73] Assignee: Radiation Dynamics, Inc., Melville, N.Y.

[21] Appl. No.: 308,015

[22] Filed: Oct. 2, 1981

[51] Int. Cl.³ .............................................. G21K 5/00
[52] U.S. Cl. .................................... 378/69; 250/399; 250/400; 250/492.3
[58] Field of Search ...................... 378/64, 68, 69, 34; 250/399, 400, 492.3

[56] References Cited

U.S. PATENT DOCUMENTS 4,151,419  4/1979  Morris ................................. 378/69
4,344,181  8/1982  Baecklund ........................... 378/45

OTHER PUBLICATIONS

"Generator with Water Dielectric for Producing Intense Pulses of Fast Electrons and Hand X Radiation", Pecherskii et al., Soviet Physics, vol. 15, No. 6, pp. 594–595, 12/1970.

Primary Examiner—Craig E. Church
Attorney, Agent, or Firm—Howard L. Rose

[57] ABSTRACT

An apparatus and system is provided for utilizing an electron beam machine to selectively and alternatively irradiate materials with electrons of X-rays; the conversion between electron radiation and X-radiation being achieved by interposing a plate of low Z material such as aluminum between the beam and the material to be irradiated, the plate having its surface facing the electron beam covered with an X-ray generating or high Z material. The plate serves as a mechanical support for the high Z material, an electron capture body and to some extent as a heat sink. Materials to be irradiated are disposed in a cart and are conveyed under the beam with the plate being interposed whenever a material to receive X-rays passes thereunder; the carts being employed to readily permit multiple passes of the material to be treated with X-rays under the beam whereby heat build up in the X-ray generating target placed over each cart may be maintained at acceptable levels. The material may also be conveyed under the beam in open top containers disposed on an endless or circular conveyor.

5 Claims, 2 Drawing Figures

METHOD AND APPARATUS FOR SELECTIVELY RADIATING MATERIALS WITH ELECTRONS AND X-RAYS

BACKGROUND OF THE INVENTION

1. Field of the Invention

The present invention relates to an electron beam utilization system and, more particularly, to an electron beam utilization system and apparatus that readily permits the intermixing of batches of material to be subjected alternatively to electron or X-ray radiation.

2. Discussion of the Prior Art

The concept of irradiation of various products by electron beams is well established in the art and is utilized in many fields; for instance, sterilization and irradiation of plastics for various purposes.

Irradiation of products particularly food stuffs, by X-rays is discussed in an article by H. W. Kock and E. H. Eisenhower appearing in Publication #1273(1965) of the National Research Council of the National Academy of Sciences. This article discusses the relative merits for purposes of food treatment of gamma rays, electron beams, and X-rays generated by electron beams impinging on an appropriate target. The article infers that X-rays are useful for treating thick or bulk materials because of the ability of X-rays to penetrate to a much greater depth than electrons and gamma rays of comparable energy.

To date there are several commercial facilities and numerous in-house facilities providing electron beam irradiation for various purposes. Also, there are numerous in-house facilities for providing gamma radiation. To the knowledge of the inventor, there is only one commercial facility available providing both electron and X-radiation probably because of the cost of two such diverse pieces of costly commercial apparatus and the cost of housing two such large pieces of equipment that must be thoroughly shielded to prevent escape of dangerous levels of radiation.

A difficulty with operating a commercial X-ray facility for treatment of materials is heat generation. The target for converting electrons to X-rays must be water cooled regardless of the target. If the cooling water is lost for any reason, the target will be destroyed quite rapidly.

Further, certain relatively inexpensive high Z materials, such as lead, are not usable as targets in a fixed installation since the heat generated is too great for practical cooling. Such targets usually employ gold as the high Z material making the installation extremely expensive and incredible so if cooling water is lost which will occur on occasion.

SUMMARY OF THE INVENTION

It is an object of the present invention to provide an irradiation system and apparatus permitting irradiation of random batches of material alternatively with X-rays or electrons by use of a single electron beam machine.

Another object of the present invention is to selectively produce X-rays from an electron beam generator by selectively interposing a high Z material between the exit window of the electron beam generator and a target.

Still another object of the present invention is to selectively interpose or remove a high Z material from between a source of high energy electrons and a target depending upon the type of radiation to which the target is to be subjected.

Yet another object of the present invention is to provide an electron absorbing carrier for materials and to subject the materials to electron beam radiation from an electron beam generator or to X-rays by interposing a rigid body or plate of low Z material capable of capturing electron radiation between the generator and the material; the plate having a coating of high material so that X-rays are generated and are basically directed through the plate towards the material to be irradiated.

Another object of the present invention is to provide a plurality of containers, carts, buckets, etc. which are passed under an electron beam in succession; the carts being covered or not covered by a plate having a high Z material coating depending upon whether the material is to be irradiated with electrons or X-rays, respectively.

Still another object of the present invention is to provide a continuous path for a plurality of containers whereby the containers are repetitively passed under an electron beam; the containers being covered by a low cost, high Z material; cooling of the materials occurring in the interval between passes under the beam.

X-rays are produced when a high Z material is passed under an electron beam by the Bremsstrahlung effect; i.e. slowdown of electrons in the high Z material produces non-characteristic (non-spectral) irradiation resulting from excitation of the electrons of the material. The thickness of the high Z material varies with the material employed; being a trade off between X-rays generation and X-ray absorption. For lead and tungsten a thickness of 30% of the electron beam range is appropriate while 40% of the range is appropriate for other material. The support for the high Z material should be thick enough to absorb the electrons passing into it. The high Z material may be lead or tungsten and the support may be any of many different materials such as aluminum. Although the support serves primarily as just that as well as an electron absorber, it, to some extent, serves as a heat dissipator or sink.

The present invention is characterized by the use of a high voltage electron beam accelerator as a source for irradiating materials with electrons or X-rays. Products to be irradiated are passed under the beam preferably in carts which are pulled under the beam in an appropriate manner. Depending on the nature of the product, the energy of the beam, the desired dose rate and total dose to be received, the electron beam may be a concentrated, swept beam or a diffuse stationary beam.

If it is desired to subject the material to be irradiated to X-rays rather than electrons, an X-ray target is interposed between the material and the electron beam generator. As indicated above, the target is a rigid body of low Z material, such as aluminum, having a coating of a known high Z material, such as lead or tungsten, over the target surface adjacent the electron beam generator. Many high Z materials are available, lead, tungsten, uranium, gold, platinum, etc. Lead is the preferred material due to its low cost which in most instances is several times less costly than the other materials.

As indicated above, a major problem with irradiation with X-rays generated by directing a high energy electron beam against a target is the rapid generation of heat which requires the use of sophisticated cooling systems and high efficiency, high cost materials to effect the conversion.

In accordance with the present invention, a plurality of containers are conveyed along a continuous path so that they are passed under the beam, repetitively, at fixed intervals. These containers holding materials to be irradiated with X-rays are fitted with a cover for producing X-rays. The intervals during which a container is not under the beam are chosen such that sufficient convection cooling may occur to permit the use of low cost high Z material without target damage.

An additional advantage of the use of the above arrangement relates to dose rates. It is well known that although X-radiation is far more penetrative than electron beam radiation of the same energy, it takes considerably longer for a given material to absorb a given dose of X-rays as it does for the same dose of electrons. Thus the repetitive passage of the containers under the beam permits accumulation of the required dose of X-rays while the material to be irradiated by electrons may be removed from the carts after only one or several passes under the beam as required to acquire the desired dose.

Thus the use of containers which are repetitively passed under the beam permits sufficient cooling of the X-rays generating target to eliminate expensive water cooling systems and the consequences of failure of such cooling systems, selective electron or X-ray irradiation by not providing or providing, respectively, a conversion target and inherent repetitive passes under the beam to permit accumulation of the required X-ray dose.

DESCRIPTION OF PREFERRED EMBODIMENTS OF THE INVENTION

Figure 1:
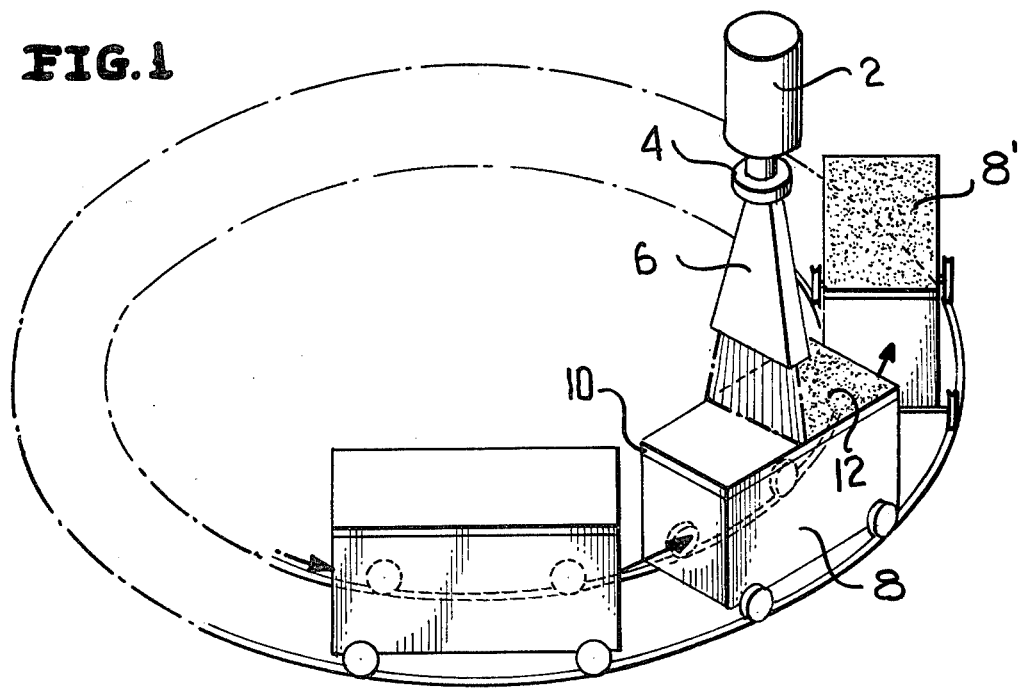
FIG. 1 is a perspective view of carts passing under an electron generator some of which have an X-ray generating cover disposed over the top of some of the carts.

Referring now specifically to FIG. 1 of the accompanying drawing, there is illustrated an electron beam accelerator 2 which may be a Dynamitron sold by the assignee of the present invention and forming the subject matter of U.S. Pat. No. 2,875,394.

A concentrated beam of electrons produced by the accelerator 2 passes through a scanning magnet 4 and thence into a scanning horn 6. The beam passes out of the scanning horn 6 via a window (not illustrated) and is directed toward a wheeled, open top cart 8 which is caused to be passed under the beam at a constant rate. The accelerator 2, magnet 4 and horn 6 are conventional in the art.

A material to be treated is disposed in the cart 8, and if it is to be subjected to X-rays, a rigid support plate 10 is placed over the open top of the cart 8. The plate 10 has its upper surface as viewed in the Figure of the accompanying drawings, covered with a material 12 which may be any one of many materials of high atomic number, high Z, that when subjected to electron irradiation are efficient in producing X-rays. The support plate 10 is fabricated of any one of many materials such as aluminum that stops electrons but does not readily absorb X-rays. Thus, the X-rays pass through plate 10 and irradiate the material in the cart 8 while the electrons not captured by the surface material 12 are captured by the plate 10.

As previously indicated, in order to be an effective X-ray-producing target, the thickness of the material 12 should be selected to produce maximum X-rays at the material to be irradiated and is, in the case of tungsten or lead, about 30% of the range of the electrons in the material.

In practice, a swept beam of small diameter is employed whereby uniformity of irradiation of the materials is obtained; a small concentrated beam being more uniform in cross section than a diffuse beam large enough to encompass the entire target. The power generated by a conventional Dynamitron may be as high as 150 KW to 750 KW. Thus, large quantities of heat are generated and must be rapidly dissipated. Such is possible in accordance with the present invention since the surface area of the cover 10 is quite large and the thickness of the cover may be chosen to provide the necessary heat sink effect with appropriate cooling intervals.

Referring again to FIG. 1 of the accompanying drawing, a second cart 8' is illustrated as leading the cart 8. It will be noted that cart 8' is not provided with a cover 10 and thus, contains materials that are to be irradiated by electron beams. Changeover from electron beam to X-radiation is achieved by merely placing cover 10 on the cart.

It should be noted that cart 8' is angled relative to cart 8 and more specifically the carts are constrained by means not illustrated but which may be rails, to follow a closed loop path. The articles to be irradiated with X-rays may circle the tracks many times to accumulate the desired dose while the material to be subjected to electron beam irradiation may be removed usually after one or a few passes. In any event, the materials treated with X-rays will require several more passes under the beam than electron-irradiated materials for the same dose. Beam current modulation may be employed to alter the relative number of passes for each type of target.

Figure 2:
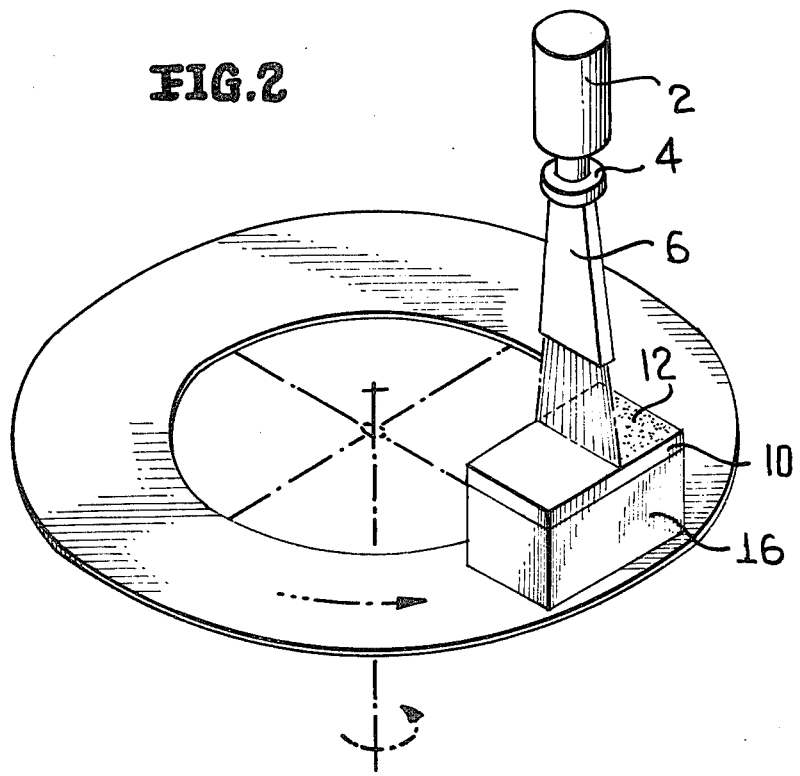
FIG. 2 is a perspective view of a conveyor located under an electron beam generator.

Referring now specifically to FIG. 2 of the accompanying drawings, like components in FIG. 2 are designated by the same reference numerals as in FIG. 1.

The mechanism for transporting materials to be irradiated under the generator 2 is a conveyor 14 preferably a closed loop conveyor or carrousel. Materials may be disposed in open-top buckets 16 or other suitable containers for transport under the beam. As in FIG. 1, the buckets may be fitted with covers such as cover 10 of FIG. 1 when it is desired to produce X-rays for irradiating a target.

The buckets may be selectively diverted from the conveyor whenever the material therein has received the desired dose, conventional apparatus being available for this function also.

It is readily apparent that the present invention permits an electron beam machine to be selectively employed as an X-ray generator on an as-desired basis with conversion from one form to the other being virtually immediately realizable so that goods to be treated with X-rays may be readily interspersed with goods to receive electron irradiation. Further, in spite of the ability to achieve substantial conversion of electron energy to X-rays, no external cooling is required. Thus, the system is completely flexible and provides a commercially feasible electron beam X-ray facility utilizing mostly conventional components and providing reasonable purchase, installation and maintenance costs.

Once given the above disclosure, many other features, modifications and improvements will become apparent to the skilled artisan. Such other modifications, features and improvements are, therefore, considered a part of this invention, the scope of which is to be determined by the following claims.

I claim:

1. The method of selectively irradiating material with X-rays or electrons comprising the steps of:
   moving a plurality of material containing open receptables under a beam of electrons sequentially and successively over a closed path,
   placing a cover having a covering of high Z material which generates X-rays when struck by electrons, over the opening of only those receptacles containing material to be irradiated by X-rays,
   repetitively passing the covered receptacles under the beams, and
   controlling the time interval between passages under the beam of the covers to prevent destructive buildup of heat in the covers.

2. A facility for selectively and alternatively irradiating material with electrons or X-rays comprising:
   means for generating a beam of electrons;
   means for conveying materials to be irradiated across the path of the beam of electrons;
   means for converting said beam of electrons into X-rays; and
   means for selectively interposing said means for converting between said means for generating and said means for conveying at a rate such that heat generated in said means for converting remains below its destruction temperature;
   wherein said means for conveying includes containers, each container having an opening facing said means for generating;
   wherein said means for converting comprises a body of low Z material and a covering for one surface of said body of high Z material;
   said one surface facing said means for generating; and
   wherein said body forms a cover positionable over at least one of said openings.

3. The apparatus according to claim 2 wherein said means for conveying comprises
   a plurality of containers,
   means for moving said containers over a closed path across the path of said beam of electrons,
   said opening of each said containers transporting material to be irradiated by X-rays being covered by a distinct one of said bodies.

4. The apparatus according to claim 2 wherein said means for conveying further includes an endless conveyor lying in a plane generally perpendicular to the beam produced by said means for generating,
   said containers being transported by said conveyor.

5. The apparatus according to claim 2 wherein said means for conveying comprises a plurality of wheeled carts forming a continuous loop of individual carts.

* * * * *